United States Patent [19]

Brandkamp

[11] Patent Number: 5,898,821
[45] Date of Patent: Apr. 27, 1999

[54] PRINTING SYSTEM WITH HALFTONE SUBSTITUTION CAPABILITY

[75] Inventor: Warren F. Brandkamp, Webster, N.Y.

[73] Assignee: Xerox Corporation, Stamford, Conn.

[21] Appl. No.: 08/786,471

[22] Filed: Jan. 21, 1997

[51] Int. Cl.$^6$ .............................. G06F 15/00; H04N 1/41; H04N 1/40; H04N 1/387

[52] U.S. Cl. .......................... 395/109; 358/429; 358/447; 358/452; 358/456; 358/536

[58] Field of Search .................................... 358/429, 447, 358/448, 456, 458, 461, 536, 445, 452, 459; 395/109, 102; 382/270, 237, 254

[56] References Cited

U.S. PATENT DOCUMENTS

| | | | |
|---|---|---|---|
| 5,410,615 | 4/1995 | Mailloux ................................... | 382/47 |
| 5,694,224 | 12/1997 | Tai ......................................... | 358/456 |
| 5,726,772 | 3/1998 | Parker et al. ............................ | 358/456 |
| 5,734,752 | 3/1998 | Knox ...................................... | 382/237 |
| 5,754,311 | 5/1998 | Ray ........................................ | 358/456 |

*Primary Examiner*—Edward L. Coles
*Assistant Examiner*—Mark Wallerson
*Attorney, Agent, or Firm*—Gary B. Cohen

[57] ABSTRACT

There is a provided method for use with a printing system in which a second halftone pattern is selectively substituted for a first halftone pattern. The printing system preferably buffers one or more of print jobs and places each of the one or more print jobs in a print ready format. The printing system further includes a processing system in which the placing of the one or more print job into the print ready format is performed, as well as a halftone substitution subsystem for selectively operating on one or more halftone patterns which reside in one of the one or more print jobs. The one of the one or more print jobs includes the first halftone pattern and the method comprises the steps of: a) determining, with the halftone substitution subsystem, whether the first halftone pattern is renderable into a corresponding image whose image quality at least equals or exceeds a preselected image quality threshold; and b) in response to determining, with step (a), that the image quality of the corresponding image will not equal or exceed the preselected image quality threshold, substituting the second halftone pattern for the first halftone pattern, the second halftone pattern equaling or exceeding the preselected image quality threshold.

10 Claims, 6 Drawing Sheets

PRINTING SYSTEM WITH HALFTONE SUBSTITUTION CAPABILITY

BACKGROUND

This invention relates generally to a printing system and, more particularly, to a halftone pattern enhancement system which substitutes a second halftone pattern for a first halftone pattern in response to a determination that the image quality of an image corresponding with first halftone pattern will not exceed a preselected image quality threshold.

Personal computers have become commonplace on the desks of most office workers. Typically, much of the work product of such computers is intended to be transformed into hardcopy via a printer using digital imaging technology. A typical printer configuration for this purpose comprises a dedicated printer coupled to the personal computer ("PC"). However, printers used for this purpose are typically small laser printers which have limited functions and features such as a limited tray capacity which restricts the number and types of copy sheets that can be used to make prints on, or which do not have a finishing capability, etc.

On the other hand, larger high speed laser printers normally have a great deal of finishing and copy sheet capability which would allow the PC user to have, for example, custom printing and finishing of his work product, an option which for many PC users would be highly desirable. In practice, the PCs can be used advantageously with a network printing system of the type combining a number of client inputs, such as the PCs, or the like, and one or more printer outputs. In one example of such network printing systems, a client at one of the inputs sends electronic documents that comprise a job over a local area network (LAN) to one of the printers selected for printing of the job. In particular, LANs provide a means by which users running dedicated processors are able to share resources such as printers, file servers and scanners. Integration of shared resources has been a problem addressed by LAN managers. LAN managers have made different network protocols transparent to devices running different network protocols LANs also have a variety of print drivers emitting different page description languages (PDLs), which are directed to specific print devices.

Examples of some recent patents relating to network environments of plural remote terminal shared users of networked printers include Xerox Corporation U.S. Pat. Nos. 5,483,653, 5,243,518, 5,226,112, 5,170,340 and 5,287,194. Some patents on this subject by others include U. S. Pat. Nos. 5,113,355, 5,113,494(originally filed Feb. 27, 1987), 5,181,162, 5,220,674, 5,247,670; 4,953,080 and 4,821,107. Further by way of background, some of the following Xerox® Corporation U.S. patents also include examples of networked systems with printers: U.S. Pat. Nos. 5,153,577; 5,113,517; 5,072,412; 5,065,347; 5,008,853; 4,947,345; 4,939,507; 4,937,036; 4,920,481; 4,914,586; 4,899,136; 4,453,128; 4,063,220; 4,099,024; 3,958,088; 3,920,895; and 3,597,071. Also noted are IBM Corp. U.S. Pat. Nos. 4,651,278 and 4,623,244, as well as Canon U.S. Pat. No. 4,760,458 and Jap. Pub. No. 59-63872 published Nov. 4, 1984. Some of these various above patents also disclose multi-functional printing systems.

Some other network system related publications include "Xerox Office Systems Technology" "Xerox 8000 Series Products: Workstations, Services, Ethernet, and Software Development" ©1982, 1984 by Xerox Corporation, OSD-R8203A, Ed. T. Linden and E. Harslem, with a "Table of Contents" citing its numerous prior publications sources, and an Abstract noting the April 1981 announcement of "the 8110 Star Information System, A New Personal Computer . . . "; "Xerox System Integration Standard Printing Protocol XSIS 118404", April 1984; "Xerox Integrated Production Publishers Solutions: " Booklet No. "610P50807" "11/85"; "Printing Protocol-Xerox System Integration Standard" ©1990 by Xerox Corporation, XNSS 119005 May 1990; "Xerox Network Systems Architecture", "General Information Manual", XNSG 068504 April 1985, with an extensive annotated bibliography, ©1985 by Xerox Corporation; "Interpress: The Source Book", Simon & Schuster, Inc., New York, N.Y., 1988, by Harrington, S. J. and Buckley, R. R.; Adobe Systems Incorporated "PostScript" Language Reference Manual", Addison-Wesley Co., 1990; "Mastering Novell Netware®", 1990, SYBEX, Inc., Alameda, Calif., by Cheryl E. Currid and Craig A. Gillett; "Palladium Print System" ©MIT 1984, et sec; "Athena85" "Computing in Higher Education: The Athena Experience", E. Balkovich, et al, Communications of the ACM, 28(11) pp. 1214–1224, November, 1985; and "Apollo87 The Network Computing Architecture and System: An Environment for Developing Distributed Applications", T. H. Dineen, et al, Usenix Conference Proceedings, June 1987.

Noted regarding commercial network systems with printers and software therefor is the 1992 Xerox Corporation "Network Publisher" version of the 1990"DocuTech®" publishing system, including the "Network Server" to customer's Novell® 3.11 networks, supporting various different network protocols and "Ethernet"; and the Interpress Electronic Printing Standard, Version 3.0, Xerox System Integration Standard XNSS 048601 (January 1986). Also, the much earlier Xerox Corporation "9700 Electronic printing System"; the "VP Local Laser Printing" software application package, which, together with the Xerox "4045" or other Laser Copier/Printer, the "6085" "Professional Computer System" using Xerox Corporation "ViewPoint" or "GlobalView®" software and a "local printer [print service] Option" kit, comprises the "Documenter" system. The even earlier Xerox Corporation "8000" "Xerox Network Services Product Descriptions" further describe other earlier Xerox Corporation electronic document printing systems. Eastman Kodak "LionHeart®" systems, first announced Sept. 13, 1990, are also noted.

Current popular commercial published "systems software" with LAN workstation connections include Novell DOS 7.0, "Windows®" NT 3.1, and IBM OS/2 Version 2.1.

Disclosures of all of the patents cited above are incorporated herein by reference.

Commonly, a PDL transmitted across a network from a client to a target printer includes one or more bitmaps representing a halftone pattern. In a typical network printing context, it has been found that the image quality of each halftone pattern rendered at the target printer will vary as a function of either the degree to which the target printer handles incoming halftone patterns or the manner in which each halftone pattern is generated at the client. In particular, with respect to known PostScript applications, handling of halftones is optimized since the default halftone designed for the printer is used. On the other hand, problems can arise with respect to those applications in which a printer specific halftone in the print driver is ignored and, instead, a set of halftones which ignores the particular marking capability of the target printer is generated.

For example, a typical PCL application generates a set of halftones suitable for use on a "write black" printer while certain PCL capable printers incorporate "write white" technology. It has been found that halftone image quality can, to a significant degree, be dependent on whether the printer is write white or write black. Accordingly, when a job with one or more halftones, generated with a PCL application, is provided to a write white printer, image degradation may result in marking unless certain selected image processing (e.g. bit adding, shifting, overstriking and/or ORing) is performed on the one or more halftones. An example of image processing useful in compensating for image quality degradation resulting from the interpretation of a PCL generated job at a white write printer can be found in U.S. Pat. No. 5,410,615 to Mailloux.

While image processing of the type found in '615 Patent may represent one viable solution to alleviating, such image processing can be less than desirable since it can represent added cost and may, under certain circumstances, not even provide the level of image quality demanded by the customer. Additionally, image processing of a halftone pattern may require a level of both processing and memory overhead that is undesirable. It would be desirable to provide a simple and economic technique which facilitates the printing of a job on a printer which is at least partially unsuitable for generating halftones in the job due to either the manner in which the job was orginally created or certain constraints of the printer upon which the job is to executed.

SUMMARY OF THE INVENTION

In accordance with one aspect of the disclosed invention, there is provided a method for use in a printing system in which a second halftone pattern is selectively substituted for a first halftone pattern. The printing system preferably buffers one or more print jobs and places each of the one or more print jobs in a print ready format. The printing system further includes a processing system in which said placing is performed, the processing system including a halftone substitution subsystem for selectively operating on one or more halftone patterns which reside in one of the one or more print jobs. The one of the one or more print jobs includes the first halftone pattern and the method comprises the steps of: a) determining, with the halftone substitution subsystem, whether the first halftone pattern is renderable into a corresponding image whose image quality at least equals or exceeds a preselected image quality threshold; and b) in response to determining, with said step (a), that the image quality of the corresponding image will not equal or exceed the preselected image quality threshold, substituting the second halftone pattern for the first halftone pattern, the second halftone pattern equaling or exceeding the preselected image quality threshold.

In accordance with another aspect of the disclosed invention, there is provided a method for use in a printing system in which a predeveloped halftone pattern is selectively substituted for an image halftone pattern. The printing system preferably buffers one or more print jobs and places each of the one or more print jobs in a print ready format. The printing system further includes a processing system in which said placing is performed, the processing system including a halftone substitution subsystem for selectively operating on one or more halftone patterns which reside in one of the one or more print jobs. The one of the one or more print jobs includes the image pattern and the method comprises the steps of: a) determining whether the image pattern corresponds with a selected pattern type; and b) in response to determining, with said step (a), that the image pattern corresponds with the selected pattern type, prohibiting substitution of the predeveloped halftone pattern for the image pattern.

DESCRIPTION OF PREFERRED EMBODIMENT(S)

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
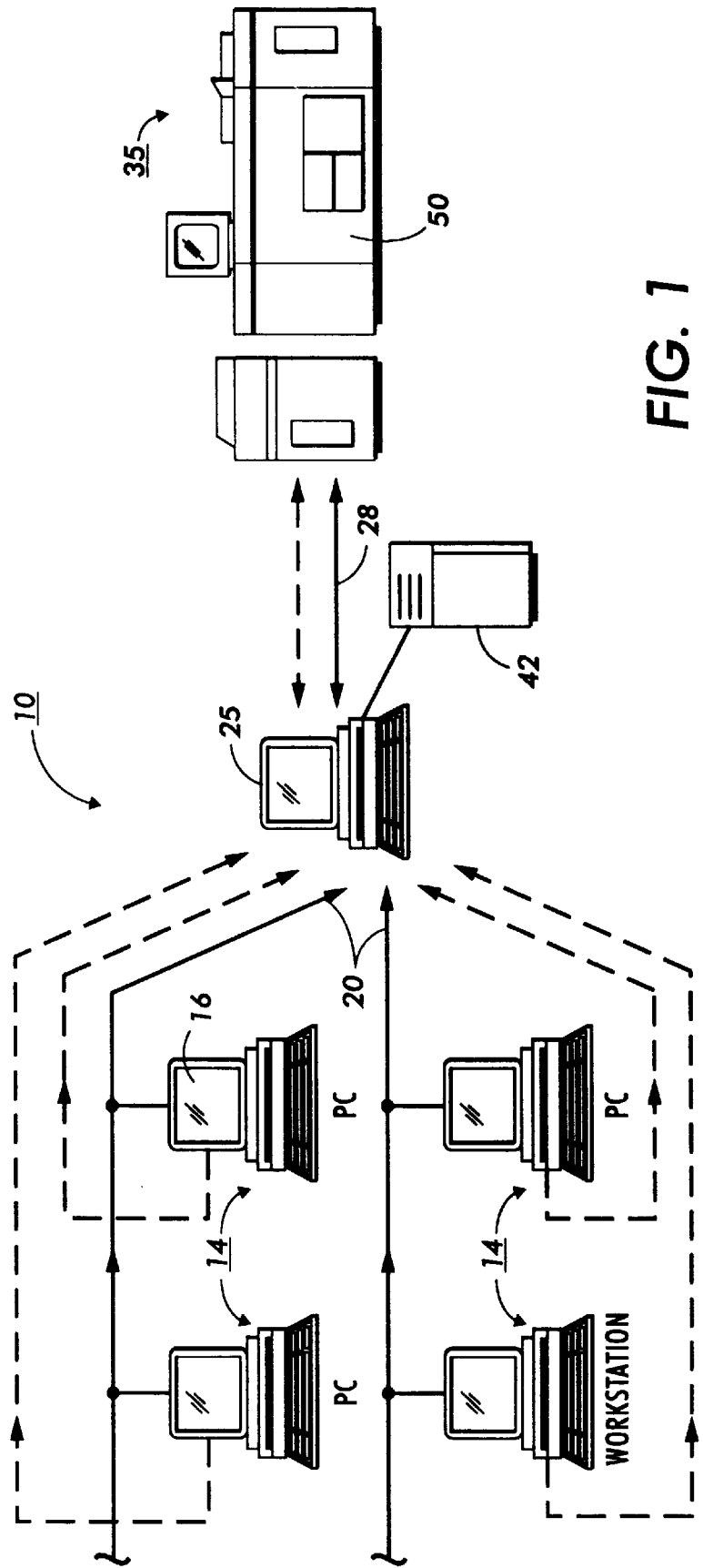
FIG. 1 is a schematic, elevational view of a network printing system including a printer interfaced with a plurality of clients by way of a network server.
Figure 2:
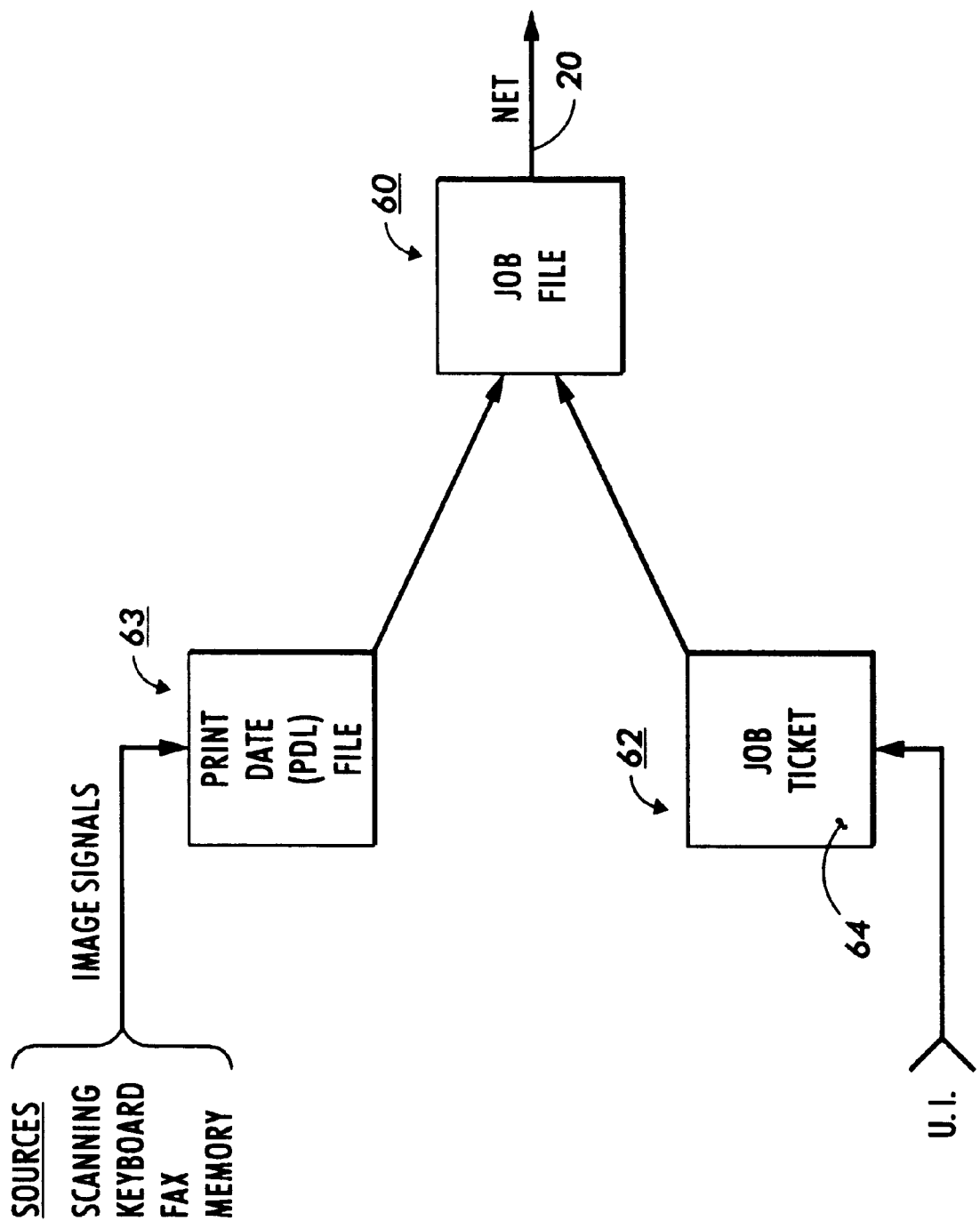
FIG. 2 is a schematic, block diagram illustrating how a print data file, written in a given page description language (PDL), and a job ticket are combined together to form a job file suitable for processing with the network printing system of FIG. 1.

Referring to FIG. 1, there is shown a network printing arrangement, designated generally by the numeral 10. The printing arrangement 10 includes a plurality of remote inputs or clients, such as PCs, workstations, etc. (referred to herein as clients 14), coupled via one or more networks 20 to a server 25. Clients 14 include a user interface 15 (FIG. 3) including a CRT type display screen 16 together with keyboard and mouse for entering programming instructions, image data, etc. Display screen 16, which may be a touchscreen, displays various job program choices, operator instructions, messages, etc. The server 25 is, in turn, coupled through one or more networks 28 to one or more printing systems 35. While separate networks 20, 28 are shown, a single network may instead be used. Referring to FIG. 2, electronic job files 60, or parts thereof, are created at the individual clients 14, each job file being comprised of a Job Specification 62 and Print Data File 63 expressed in a PDL. Job Specification 62 is in the form of a Client Server Job Ticket 64 having instructions for routing, handling, and processing the job 62. In practice, the PDL of Print Data File 63 is either written in Postscript Registered TM ("PS") or Hewlett Packard Printer Control Language ("HP-PCL"). The jobs in Print Data File 63 are electronic in form, consisting of image signals or pixels generated, for example, by scanning hard copy documents and converting the document images to image signals or pixels, directly by a keyboard, taken from memory, or consisting of page format and/or graphic output commands all encoded in one of the preferred PDL encodings. The content of the job files are normally compressed to increase bandwidth and reduce the amount of storage required. The image signals, pixels or PDL instructions in Print Data File 63 are arranged as electronic documents or pages for printing on a print media such as paper stock or sheets.

The programming instructions in the Client Server Job Ticket 64 accompanying the job file 60 may include selection of the printer in the case where plural printers are available for the client or user to choose from in printing system 35. Where a printing system 35 has printers with different features, functions, speeds, etc., it may be necessary that the client select the printer that is to be used initially so that a Client Server Job Ticket 64 with the program selections available with that printer may be displayed at the client's workstation 14 as described more fully in U.S. Pat. Nos. 5,450,571 and 5,467,434, the disclosures of which patent are incorporated herein. During the printing process, the server 25 transmits the printing instructions from the Client Server Job Ticket 64 to the printing system selected.

The server 25 comprises any suitable interface for receiving job files 60 from workstations via network 20, with the ability to access and decode the job processing instructions on the accompanying client server job ticket. The server 25 preferably includes an on-board memory of suitable capacity for temporarily storing the job files pending processing thereof by printing system 35. The print manager on-board memory may be large enough to support long term storage of the job files or parts of the job files. Alternately, one or more remote memories 42 (FIG. 1) may be provided for this purpose.

Figure 3:
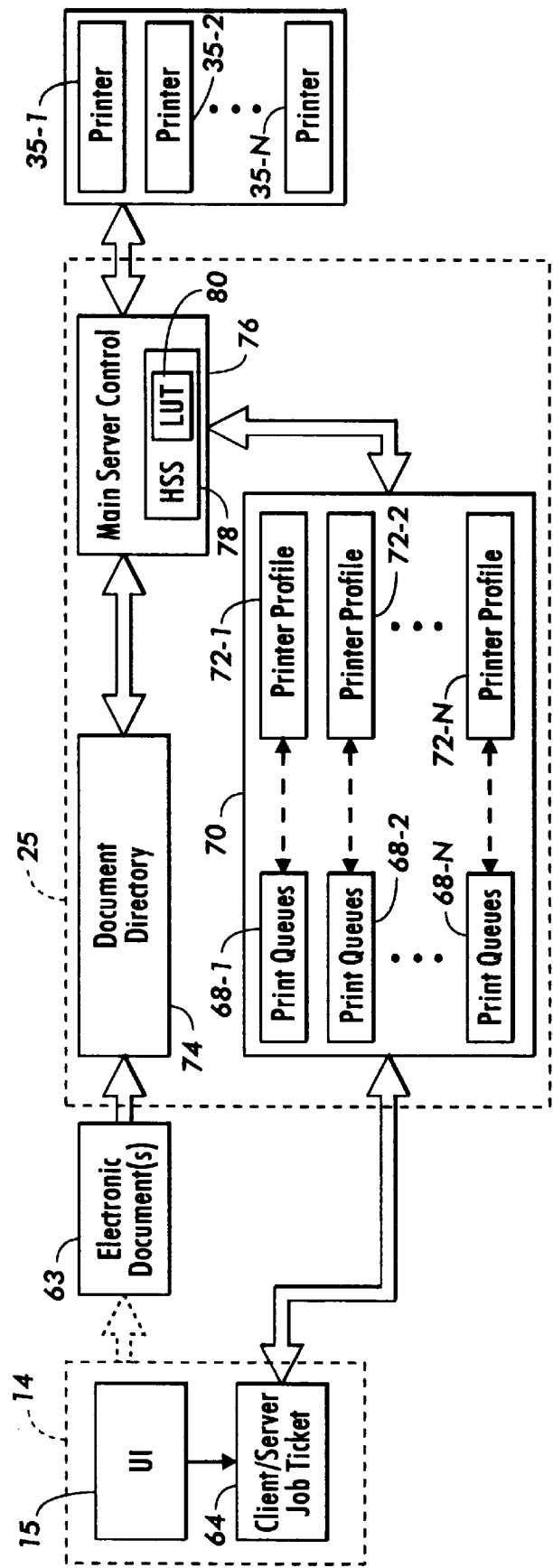
FIG. 3 is a schematic, block diagram showing certain aspects of the network printing system of FIG. 1 in greater detail.

Referring to FIG. 3, the relationship of a single client 14 to the server 25 is shown in further detail. In the illustrated embodiment of Figure. 3,the client 14 includes one of the Ul 15 and the electronic Job Ticket 64, which job ticket permits the user to program a print job for transmission to the server 25. In general, the Job Ticket 64 includes information relating to attributes that characterize a document job. More particularly, the attributes typically include job level attributes (e.g. set quantity, copy count, finishing requirements, plex and page numbering), page level attributes (e.g. stock color separation information, image quality, reduction/enlargement and sides to be imaged), and image level attributes (e.g. size of image, color of image, location of image relative to a page). In one example, electronic document(s) 63, which includes image and attribute related information, is transmitted from the client 14 to the server 25.

Referring still to FIG. 3, the server 25 includes one or more queues 68-1, 68-2, . . . 68-N, the queues (e.g. print queues) 68 being provided, for selection by the user, on a section or file 70. Each of the queues 68 is mapped to one of configuration files or profiles (e.g. print profiles) 68-1, 68-2. . . 68-N. Each of the printer profiles includes a list of printer properties, the properties, in one example, being arranged advantageously to describe the combinations of job selections available at a selected one of the printers or family document processing units 35. Additionally, documents stored by way of memory 42 (FIG. 1) are preferably referenced by way of a document directory 74.

Each of the print queues 68 is associated with one or more of the document processing units or printers 35. It should be recognized that there may be plural queues for the same printer, as in the case where virtual printers are provided. Accordingly, in a second example, a printer (referred to herein as virtual printer) may be set up to provide different printer functions, with a corresponding print queue and profile provided for each different printer setup.

Referring still to FIG. 3, the server 25 includes a main server control 76 which processes job files to place them in order for printing. Examples of servers which are capable of placing a job in print ready format are disclosed by the following patents: U.S. Pat. No. 5,226,112 to Mensing et al. (Issued: Jul. 6, 1993); U.S. Pat. Nos. 5,113,494 (disclosing a server processor suitable for RIPing a document), 5,220,674; and 5,483,653 (disclosing a server with a parser and storage). In the preferred embodiment, the main server control 76 includes a halftone substitution system ("HSS") 78 having a look-up table ("LUT") 80, the significance of which HSS and LUT will appear from the discussion below. The disclosure of each patent cited in this paragraph is incorporated herein by reference.

Figure 4:
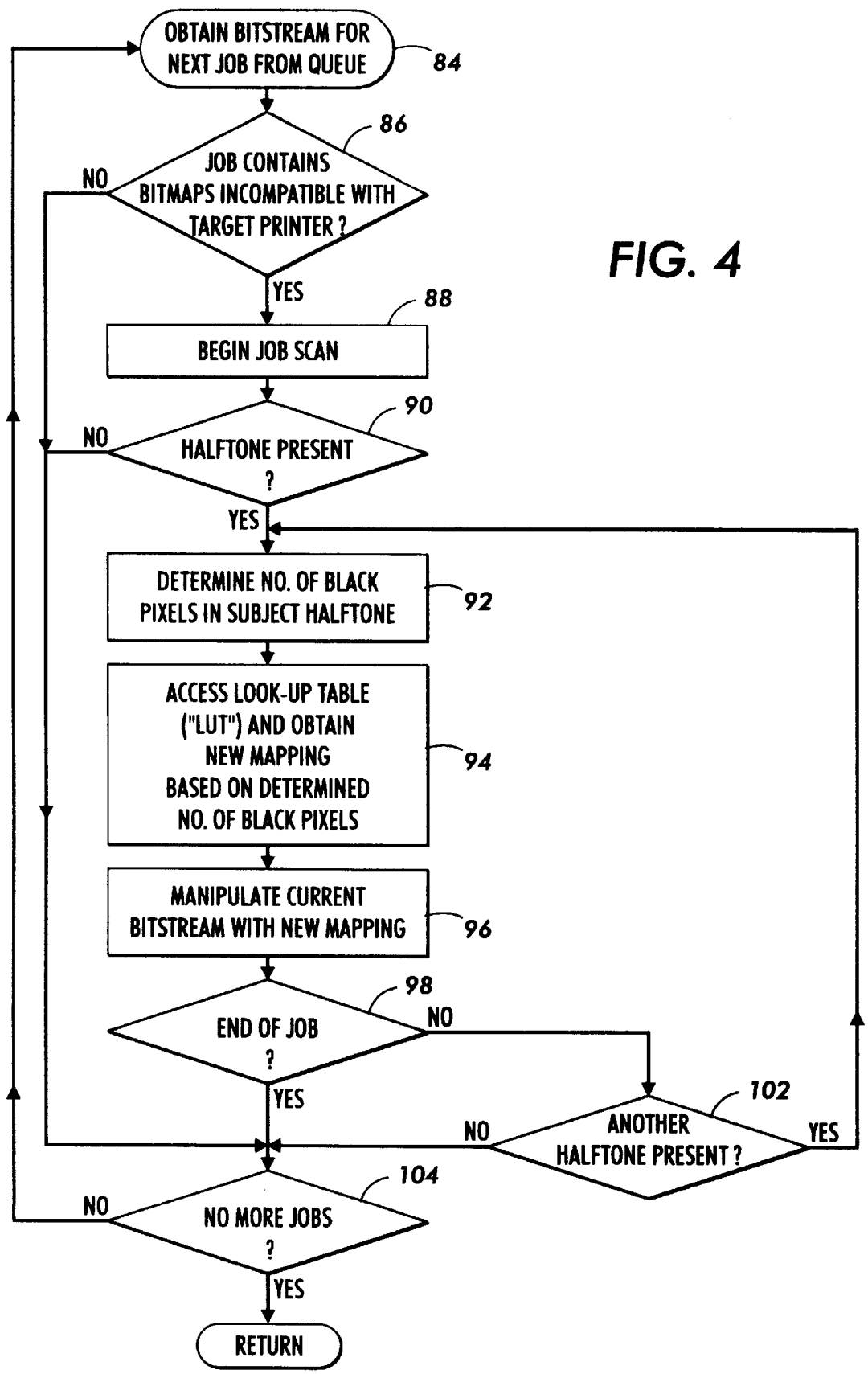
FIG. 4 is a flow diagram illustrating a halftone pattern replacement technique embodying a part of the present invention.

Referring to FIGS. 3 and 4, operation of the halftone HSS 78 will be discussed. In a preferred mode of operation a bitstream, representative of a subject job, is obtained from memory 42 (FIG. 1) (step 84) by reference to document directory 25. At step 86, it is determined whether the subject job includes bitmaps that are incompatible with a target printer to which the job is to be transmitted. The word "incompatible", as used in the present description, refers to a situation in which the subject job can be printed at the target printer, but the image quality of the included halftone (s) tends to be less than optimal. In one example, less than optimal printing would occur when a job written with a PCL application is to be sent to a write white printer for marking. Conceivably, incompatibility could occur in other situations, such as when the application for generating the PDL of a subject job does not use the default halftone designed for the target printer. Determination of incompatibility resulting from the PDL type of the subject job is facilitated by use of a system that guesses the PDL of incoming jobs, such as the guessing system disclosed by U.S. Pat. No. 5,402,527, the disclosure of which is incorporated herein.

When it is determined that the subject job includes one or more bitmaps corresponding respectively with one or more incompatible halftone patterns, the job is scanned (steps 88 and 90) until the first halftone pattern of the subject job is found. It will be appear from the description below that, under certain circumstances, it may be desirable to override the HSS 78 even when the answer to the question of step 86 is in the positive. If at least one incompatible halftone pattern is present in the subject job, then the process proceeds to step 92; otherwise, the process proceeds to step 104 where the system checks to ascertain whether any more jobs are ready to be examined by the main server control.

At step 92, an index of fractional area coverage is obtained. In one example, such coverage is assessed by counting the number of black pixels in the bitmap of the first halftone pattern. With this index "in hand", the LUT 80 is accessed via step 94. Preferably, the LUT comprises a set of fractional coverage indexes mapped against a set of halftone patterns. Accordingly, pursuant to step 94, the index ascertained with step 92 is used to obtain a second halftone pattern to replace the first halftone pattern. In turn, at step 96, a substitution of the second halftone pattern into the bitstream of the subject job is executed.

It should be appreciated that this substitution can be achieved by one of several conventional approaches. In one approach the substitution can be achieved as an up-front make-ready operation in which the PDL of the subject job is reconstructed by substituting the halftone pattern obtained from the LUT with the unacceptable, original halftone. Alternatively, the substitution process could be integrated with an interpretation process of the type disclosed by U.S. Pat. No. 5,504,843. As integrated with the interpretation process of the '843 Patent a substituted bitmap may be stored in mass memory in place of the unacceptable, original halftone pattern.

After a halftone substitution is achieved by way of step 96, a check is performed at step 98 to determine if any further halftone substitution is required for the subject job. Assuming, that scanning of the job has yet to be completed, the process proceeds to step 102 where there is a branching to either step 92, for manipulation of another halftone pattern or to step 104 where a determination, as to whether another job is to be scanned, is made.

Returning briefly to a consideration of step 86, there is some risk that the process may inadvertently be used to alter a "true" pattern under the assumption that it is a halftone coded pattern. In such cases the correction for patterns could be selectively disabled by the user so that the original pattern of a given page (or pages) would remain unmanipulated. Other approaches for achieving this disabling or overriding feature are contemplated by the preferred embodiment. For example, a software "guesser" for detecting the presence of a true pattern and selectively disabling the substitution routine could be provided. This guesser would employ logic based on both the overall pattern size (true patterns tend to be larger than halftone patterns) as well as the number of contiguous black pixel groupings to determine the likelihood of the information being a true or halftone pattern. If a true pattern were detected by the guesser, no corrective action would be taken; otherwise, upon detection of a pattern, the abovedescribed substitution technique would be employed.

Figure 5:
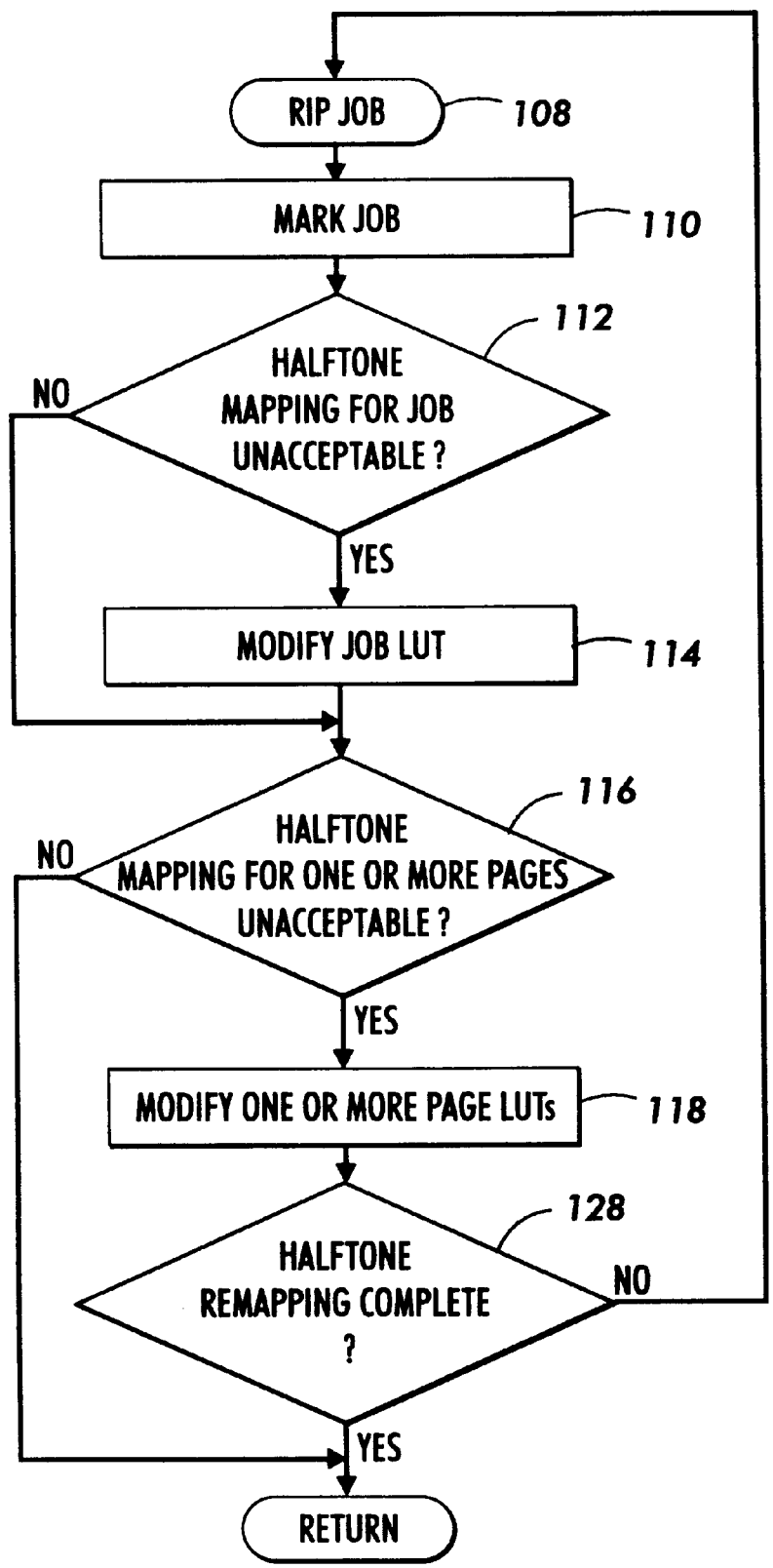
FIG. 5 is a flow diagram illustrating an approach for enhancing the halftone pattern replacement technique of FIG. 4.
Figure 6:
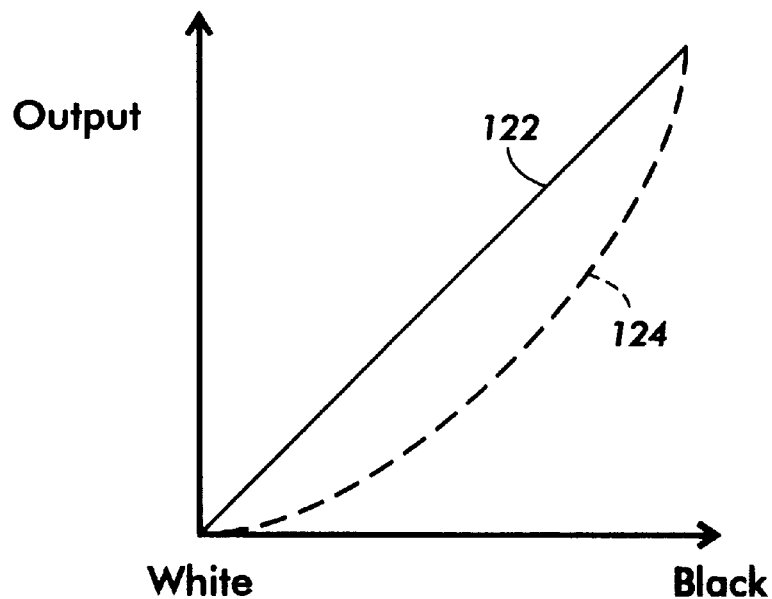
FIG. 6 is a view of actual and tone reproduction curves for a given halftone pattern.
Figure 7:
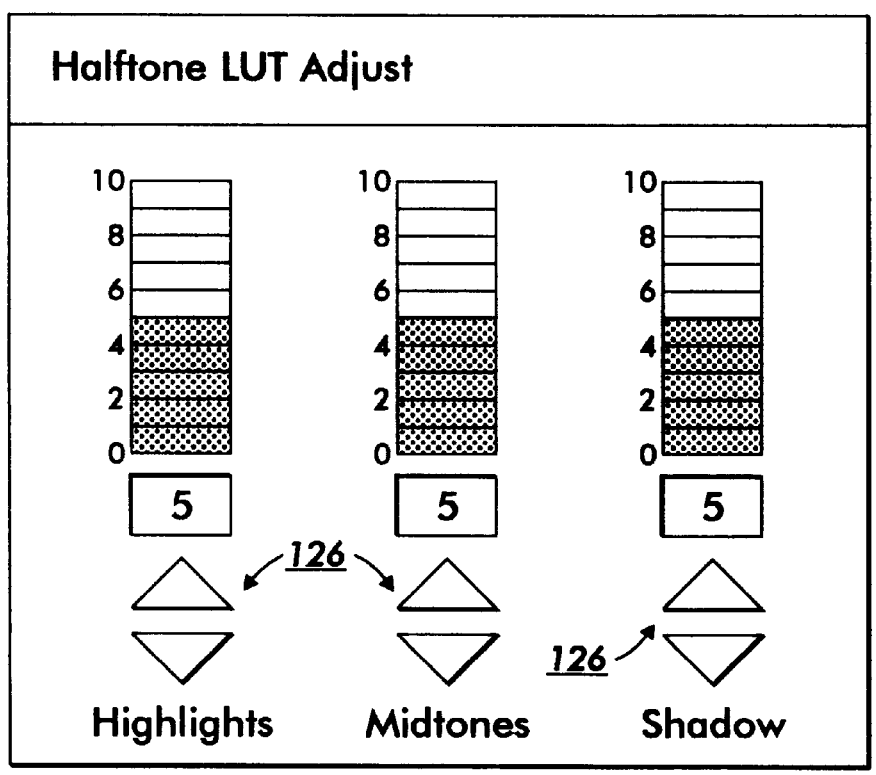
FIG. 7 is a schematic, elevational view of a display for a user interface in which exemplary mimics, representative of adjustable level controls for respective halftone appearance attributes are displayed.

Referring to FIGS. 5–7, the preferred embodiment contemplates a tuning enhancement for the above-described substitution technique. More particularly, it may be found that a substituted halftone pattern may still fail to provide the sort of tone reproduction expected by a given user. Essentially, this situation can be remedied by reconfiguration of the LUT 80 in accordance with the procedure of FIG. 5. More particularly, after RIPing and marking a subject job (steps 108 and 110), a determination can be made at step 112 to determine if the halftone patterns of the job are acceptable. It should be understood that the preferred embodiment contemplates the use of a LUT that can accommodate for pattern substitution on both a job level and a page level. The concept of treating a job on both job and page levels is discussed further U.S. Pat. No. 5,493,634, the disclosure of which is incorporated herein.

Assuming that adjustment of the LUT at a job level is desired, a corresponding modification of the LUT is achieved at step 114. This modification may include providing new patterns which accommodate for the desired modification. Referring to steps 116 and 118, adjustment of halftone patterns at a page level is shown.

Referring to FIGS. 6 and 7, further discussion regarding modification of the LUT, on either a job or page level is discussed. Referring specifically to FIG. 6, a typical halftone pattern may be characterized by a tone reproduction curve ("TRC") 122. Depending on the particular preference of a user, it may be desirable to adjust the TRC to obtain an alternative image appearance, which appearance might be characterized by alternative TRC 124. In one example, the alternative TRC is obtained by adjusting certain halftone appearance attributes associated with part or all of the subject job.

Referring to the illustrated embodiment of FIG. 7, the attributes may be characterized by, among other halftone appearance attributes, "Highlights", "Midtones" and "Shadow". It should be recognized that the appearance of a given halftone pattern varies as a function of the settings of these attributes. Preferably, the setting of these attributes is achieved with a suitable user interface of the type shown in FIG. 7 as a graphic user interface ("GUI"). In the illustrated embodiment of FIG. 7, the GUI is configured with three adjustable mimics which permit a user to adjust halftone pattern appearance by simply manipulating corresponding "soft" buttons 126. In practice, the buttons are employed be modify a LUT corresponding with either an entire job or a set of one or more pages. In turn, the TRC for part or all of a job, processed in accordance with the procedure of FIG. 5, is adjusted to accommodate for a particular user's needs.

Referring again to FIG. 5, step 128 provides for confirmation of LUT reconfiguration. To obtain confirmation, after modifying a given Job or Page(s) LUT, the process loops back to step 108 so as to demonstrate the effect of LUT modification on the halftone output of the subject job to the user.

Numerous features of the preferred embodiment will, in view of the description above, be appreciated by those skilled in the art:

First, there is provided a technique which substitutes a second halftone pattern for a first halftone pattern, when an incompatibility between a job, including the first halftone pattern, and a target printer exist. Preferably, by way of the technique, the incompatibility is noted initially by analyzing one or more job attributes (e.g. determining the PDL in which the job is written) and each halftone requiring substitution is located. For each located halftone pattern, an index corresponding with fractional area coverage is determined and a LUT, mapping indexes with halftone patterns, is accessed to obtain a corresponding substitute halftone pattern. In turn, the substitute halftone pattern(s) is employed to manipulate the bitstream of the job.

Second, the LUT for at least part of a subject job may be adjusted or tuned to reshape the TRC corresponding with the at least part of the subject job. Preferably, in response to RIPing and marking the subject job, a determination is made as to whether the halftone mapping of the LUT is suitable for facilitating acceptable output of one or more halftone patterns associated with the subject job. If the mapping is unsuitable, then one or more halftone appearance attributes, which are displayed by way of a set of mimics on a GUI, can be adjusted by a user. Adjustment of the attributes allows for reconfiguration of the LUT so that image quality of the halftone pattern output is brought into accordance with the requirements of the user.

What is claimed is:

1. In a printing system for buffering one or more print jobs and placing each of the one or more print jobs in a print ready format, each of the print jobs being expressed in one of a plurality of page description languages, the printing system including a processing system in which said placing is performed, the processing system including a halftone substitution subsystem for selectively operating on one or more halftone patterns which reside in one of the one or more print jobs, the one of the one or more print jobs including a first halftone pattern, a method of selectively substituting a second halftone pattern for the first halftone pattern, comprising:

a) when a preselected condition is met, determining, with the halftone substitution subsystem, whether the first halftone pattern is renderable into a corresponding image whose image quality at least equals or exceeds a preselected image quality threshold;

b) in response to determining, with said step (a), that the image quality of the corresponding image will not equal or exceed the preselected image quality threshold, substituting the second halftone pattern for the first halftone pattern, the second halftone pattern equaling or exceeding the preselected image quality threshold; and.

c) wherein said preselected condition is met when said processing system determines that the one of the one or more print jobs is expressed in a selected one of the plurality of page description languages.

2. The method of claim 1, wherein said (b) includes converting the first halftone pattern to the second halftone pattern with a look-up table.

3. The method of claim 2, in which the first halftone pattern includes a preset number of pixels disposed in one of a plurality of states and the look-up table is configured so that the preset number of pixels disposed in one of a plurality of states is mapped against the second halftone pattern, wherein said (b) includes using the preset number of pixels disposed in one of the plurality of states as an index into the look-up table for obtaining the second halftone pattern.

4. The method of claim 2, in which the look-up table includes a current mapping scheme where a plurality of indexes are mapped against a plurality of halftone patterns, further comprising modifying the mapping scheme to optimize execution of said (b).

5. The method of claim 2, in which the first halftone pattern corresponds with a first tone reproduction curve, further comprising corresponding the second halftone pattern with a second tone reproduction curve.

6. The method of claim 5, in which the second tone reproduction curve varies as a function of selected halftone appearance attributes, further comprising configuring the second halftone pattern by adjusting the selected halftone appearance attributes.

7. The method of claim 6, in which the printing system includes a user interface with a display, wherein said adjusting includes setting, with the user interface, one or more of a plurality of graphic mimics corresponding respectively with levels of the halftone appearance attributes.

8. In a printing system for buffering one or more print jobs and placing each of the one or more print jobs in a print ready format, the printing system including a processing system in which said placing is performed, the processing system including a halftone substitution subsystem for selectively operating on one or more halftone patterns which reside in one of the one or more print jobs, the one of the one or more print jobs including an image pattern, a method of selectively substituting a predeveloped halftone pattern for the image pattern, comprising:

a) determining whether the image pattern corresponds with a selected pattern type; and b) in response to determining, with said step (a), that the image pattern corresponds with the selected pattern type, prohibiting substitution of the predeveloped halftone pattern for the image pattern.

9. The method of claim 8, in which the image pattern is characterized by a pattern size, wherein said (a) includes determining whether the image pattern corresponds with the selected pattern type by determining whether the pattern size of the image pattern exceeds a preselected threshold pattern size.

10. The method of claim 8, in which the image pattern includes one or more contiguous black pixel groupings, wherein said (a) includes determining whether the image pattern corresponds with the selected pattern type by determining whether the number of contiguous black pixel groupings exceeds a preselected number.

* * * * *